United States Patent
Yano et al.

(10) Patent No.: US 7,728,476 B2
(45) Date of Patent: Jun. 1, 2010

(54) INNER ROTOR BRUSHLESS MOTOR

(75) Inventors: Tadashi Yano, Ueda (JP); Nobuchika Maruyama, Ueda (JP)

(73) Assignee: Shinano Kenshi Kabushiki Kaisha, Nagano (JP)

( * ) Notice: Subject to any disclaimer, the term of this patent is extended or adjusted under 35 U.S.C. 154(b) by 0 days.

(21) Appl. No.: 12/328,461

(22) Filed: Dec. 4, 2008

(65) Prior Publication Data

US 2009/0146516 A1    Jun. 11, 2009

(30) Foreign Application Priority Data

Dec. 5, 2007    (JP) .............................. 2007-314542

(51) Int. Cl.
*H02K 5/00* (2006.01)
(52) U.S. Cl. ...................... 310/91; 310/67 R
(58) Field of Classification Search .............. 310/67 R, 310/91, 89, 90
See application file for complete search history.

(56) References Cited

U.S. PATENT DOCUMENTS

| | | | |
|---|---|---|---|
| 5,497,040 A * | 3/1996 | Sato ........................ | 310/67 R |
| 6,762,521 B2 * | 7/2004 | Peter et al. ................. | 310/89 |
| 6,943,471 B2 * | 9/2005 | Toyokawa et al. .......... | 310/90 |
| 7,145,272 B2 * | 12/2006 | Nayak et al. .............. | 310/68 B |

FOREIGN PATENT DOCUMENTS

| JP | 09-322507 | * 12/1977 |
|---|---|---|
| JP | 06-078504 | 3/1994 |
| JP | 09-140083 | 5/1997 |
| JP | 10-234158 | 9/1998 |
| JP | 2002-021794 | 1/2002 |
| JP | 2002-262517 A | 9/2002 |
| JP | 2005-229698 A | 8/2005 |
| JP | 2007-068324 | 3/2007 |

* cited by examiner

*Primary Examiner*—Nguyen N Hanh
(74) *Attorney, Agent, or Firm*—Birch, Stewart, Kolasch & Birch, LLP

(57) ABSTRACT

An inner rotor brushless motor is miniaturized, flattened and made lighter without reducing motor performance. A rotor and a stator are enclosed inside a sealed case (i.e., a sealed space) assembled by covering an attachment base with a cup-shaped bracket. A motor substrate on which a motor driving circuit is formed is provided in a gap formed in an axial direction between (i) the rotor and the stator and (ii) a base portion inside a bracket opening of the bracket.

7 Claims, 2 Drawing Sheets

INNER ROTOR BRUSHLESS MOTOR

BACKGROUND OF THE INVENTION

1. Field of the Invention

The present invention relates to an inner rotor brushless motor that is used in a vehicle air conditioner, a battery cooling apparatus, or the like.

2. Related Art

As one example, an outer rotor DC brushless motor used as the driving apparatus for a fan used in a vehicle will now be described. A motor substrate on which a driving circuit is provided is split on two levels and enclosed inside an upper and lower housing that are made of resin. A concave is formed in the upper housing and a bearing sleeve is provided inside the concave so as to protrude vertically upward. A bearing shaft is rotatably supported in the bearing sleeve. The bearing shaft extends beyond the rotor and a fan is provided on the front end of the shaft. The stator core is assembled so as to be slidably fitted onto the bearing sleeve and contacts a stepped portion thereof.

When the rotor is rotated, air is sucked in from air inlets provided in a housing side surface and is expelled toward the fan from outlets provided in a rotor end surface so as to remove heat produced by the motor substrate and heat produced by the coils (see Patent Document 1). Also, although not limited to use in a vehicle, an inner rotor brushless motor that is equipped with means for detecting the rotational position and rotational velocity of the motor (and therefore has improved motor detection precision), and has been miniaturized by reducing the thickness in the radial direction has also been proposed (see Patent Document 2).

Patent Document 1
  Japanese Laid-Open Patent Publication No. 2002-262517

Patent Document 2
  Japanese Laid-Open Patent Publication No. 2005-229698

SUMMARY OF THE INVENTION

However, for an outer rotor or inner rotor brushless motor, the thickness of the motor substrate on which the motor driving circuit is formed is added to the thickness of the stator core and/or the rotor, resulting in the problem of the motor construction tending to be thick in the axial direction. Since a motor used in a vehicle in particular needs to be sufficiently water resistant to prevent damage to the driving circuit even after a salt spray test, a cover (or "case") for protecting the circuit substrate is also provided, resulting in a construction that tends to have an increased thickness in the axial direction. For example, among motors with an output of 50W, motors that include a cover for enclosing the motor substrate and have a thickness of around 65 mm to 70 mm in the axial direction are in use.

Also, in the case of electronic appliances used in vehicles, although the number of modular components and substrate-mounted electronic components such as sensors and motors is increasing due to comfort, safety, and environmental considerations, in response to environmental concerns, it is necessary to reduce the size and weight of the motors to reduce the overall weight of the vehicle.

In addition, although the number of electronic components mounted in vehicles is increasing, to reduce the space taken up by such components in a vehicle, there is demand for reductions in the thickness of (i.e., to flatten) motors in the axial direction without reducing the motor performance.

The present invention was conceived to solve the problem described above and it is an object of the present invention to provide an inner rotor brushless motor that is miniaturized, flattened and made lighter without reducing the motor performance.

To achieve the stated object, an inner rotor brushless motor according to the present invention has a rotor disposed in a space surrounded by a ring-shaped stator, wherein the rotor and the stator are enclosed inside a sealed case assembled by covering an attachment base with a cup-shaped bracket, and a motor substrate on which a motor driving circuit is formed is provided in a gap formed in an axial direction between (i) the rotor and the stator and (ii) a base portion inside a bracket opening of the bracket.

The rotor may include a cup-shaped rotor yoke and magnets that are provided on an outer circumferential surface of the rotor yoke, and may be coupled to a motor shaft at a center of an opening of the rotor yoke, the motor shaft may be supported on a bearing portion provided in a center of the bracket opening, and the rotor may be rotatably assembled on the bracket with the opening of the rotor yoke facing the base portion inside the bracket opening.

Discrete components that are comparatively high may be disposed on a surface of a motor substrate that faces the rotor yoke and located inside an opening of the rotor yoke, and discrete components that generate a lot of heat may be disposed on a surface of the motor substrate that faces the bracket.

The bracket and the attachment base may be sealed by a seal member, and a stator core may be sandwiched between a stepped surface of the seal member and a stepped surface on an inner wall surface of the bracket.

The inner rotor brushless motor may be a fan motor for use in a vehicle and may have a fan attached to a shaft end portion of a motor shaft that extends outside the bracket.

By using the inner rotor brushless motor described above, a rotor and a stator are enclosed inside a sealed case assembled by covering an attachment base with a cup-shaped bracket, and a motor substrate on which a motor driving circuit is formed is provided in a gap formed in an axial direction between (i) the rotor and the stator and (ii) a base portion inside a bracket opening. By doing so, the motor substrate can be disposed within the range in the axial direction of a sealed case, which is surrounded by the bracket that constructs the exterior of the motor and the attachment base, and within the area of the base portion of the bracket opening, which makes it possible to miniaturize and flatten the motor in the axial direction and to reduce the motor weight.

Also, the rotor includes a cup-shaped rotor yoke and magnets that are provided on an outer circumferential surface of the rotor yoke, and is coupled to a motor shaft at a center of an opening of the rotor yoke, the motor shaft is supported on a bearing portion provided in a center of the bracket opening, and the rotor is rotatably assembled on the bracket with the opening of the rotor yoke facing the base portion inside the bracket opening. In this way, since the rotor yoke opening is disposed facing the base portion inside the bracket opening and substrate-mounted components can be disposed using the empty space inside the rotor yoke opening, it is possible to miniaturize the motor.

Since the discrete components that are comparatively high are disposed on the surface of the motor substrate that faces the rotor yoke and are located in the rotor yoke opening, the height of such substrate-mounted components can be absorbed in the axial direction in the empty space inside the rotor yoke opening, which makes it possible to flatten the motor (i.e., to make the motor slimmer). Also, if discrete components that generate a lot of heat are disposed on the surface of the motor substrate that faces the bracket, it will be possible to increase the dissipation of heat via the bracket that is made of metal.

The bracket and the attachment base are sealed by the seal member, and since the stator core is sandwiched between the stepped surface of the seal member and the stepped surface of the inner wall surface of the bracket, it is possible to provide a motor whose driving circuit is not damaged by a salt spray test and is therefore sufficiently waterproof and vibration-proof to withstand use in extreme environments.

By constructing a fan motor for use in a vehicle by attaching a fan to a shaft end of the motor shaft that extends out of the bracket, it is possible for the fan to draw air from the center in the axial direction and expel air toward the outer circumference. For this reason, it becomes easier for heat generated by heat generating components and the motor coils to dissipate via the bracket, and therefore the dissipation of heat can be further improved.

DESCRIPTION OF THE PREFERRED EMBODIMENTS

Figure 1:
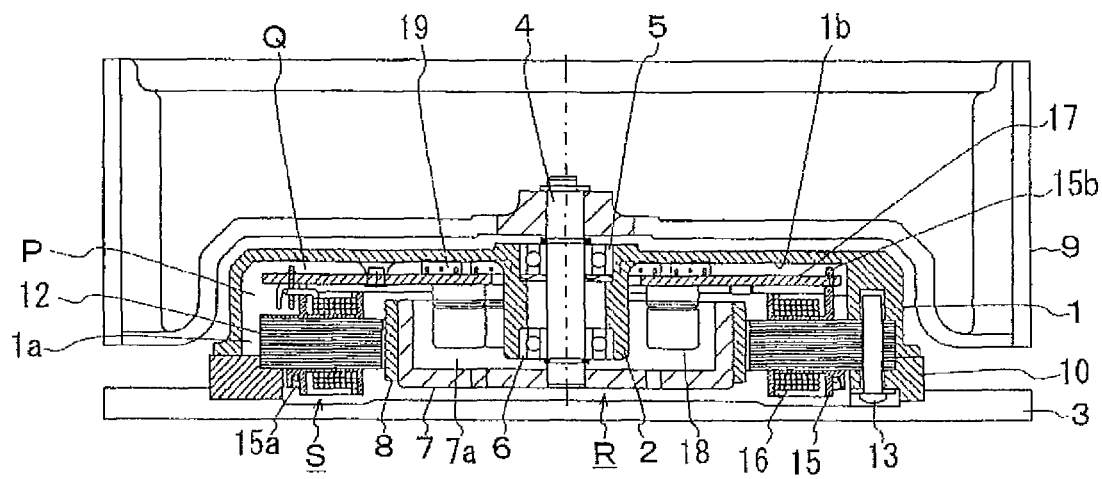
FIG. 1 is a cross-sectional view of an inner rotor brushless motor.
Figure 2:
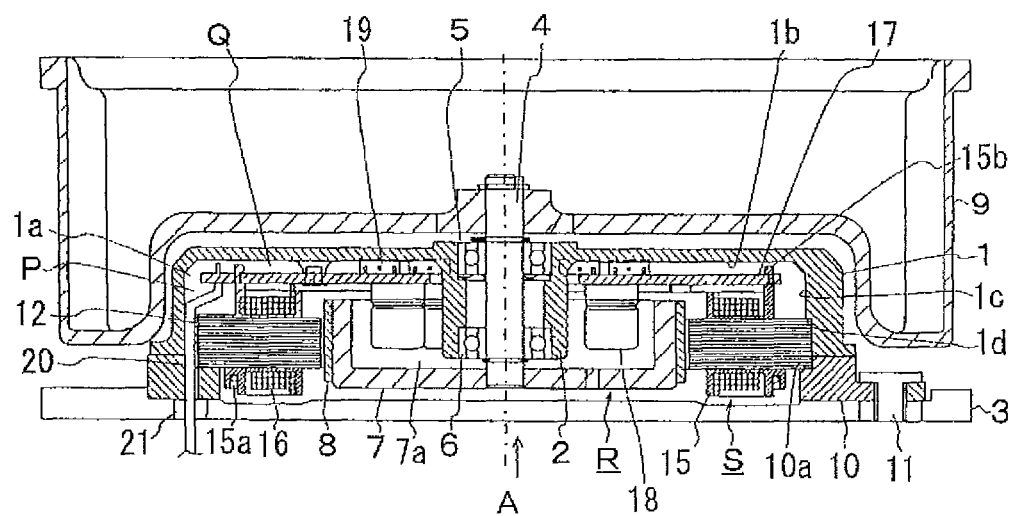
FIG. 2 is a cross-sectional view of an inner rotor brushless motor.
Figure 3:
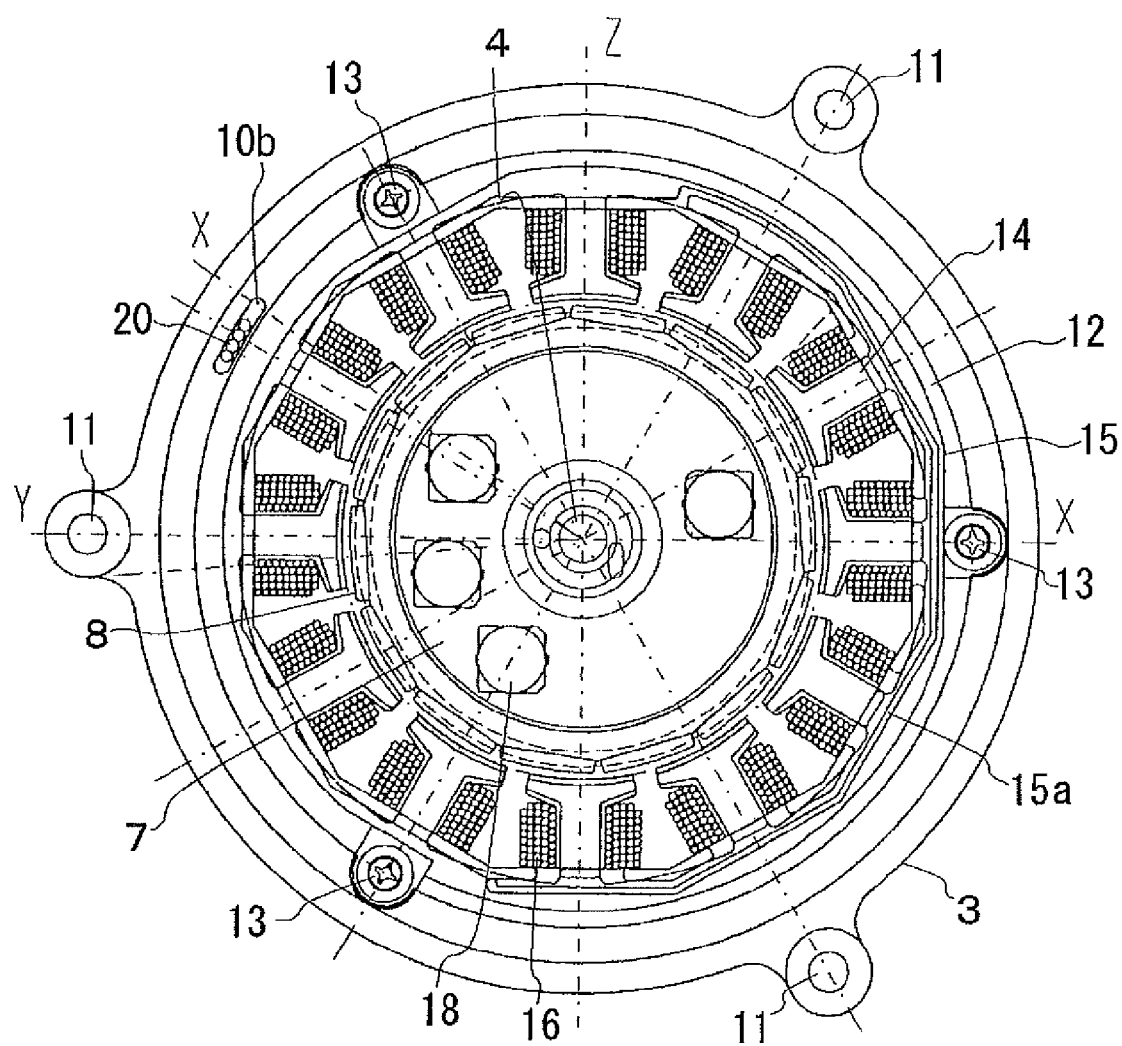
FIG. 3 is an internal plan view when looking at the motor shown in FIG. 2 from the direction of the arrow A.

A preferred embodiment of an inner rotor brushless motor according to the present invention will now be described with reference to the attached drawings. The present embodiment is described by way of an example of a fan motor for use in a vehicle (an inner rotor DC brushless motor) where the rotor is disposed within a space surrounded by a ring-shaped stator core. FIG. 1 is a cross-sectional view along a line X-O-Z in FIG. 3, FIG. 2 is a cross-sectional view along a line Y-O-X' in FIG. 3, and FIG. 3 is an internal plan view when looking from the direction of the arrow A in FIG. 2.

The overall construction of an inner rotor DC brushless motor will now be described with reference to FIGS. 1 to 3. In FIG. 1, a hollow cylinder portion 2 is erected in a center of a bracket opening 1a of a cup-shaped bracket 1. In the hollow cylinder portion 2, a motor shaft 4 is rotatably supported via bearing portions (such as ball bearings or sleeve bearings) 5, 6. The bracket 1 serves as both a rotor bearing portion and a motor case. A metal cup (for example, an aluminum bracket) is favorably used as the bracket 1. The bracket 1 that constructs the exterior of the motor is attached to and covers an attachment base 3 and by doing so, a rotor R and a stator S become enclosed inside a sealed case (i.e., inside the sealed space P). A motor substrate 17 on which a motor driving circuit is formed is provided in a gap Q formed in the axial direction between (i) the rotor R and the stator S and (ii) a base portion 1b inside the bracket opening 1a. This means that the motor substrate 17 is disposed within the range in the axial direction of the case, which is surrounded by the bracket 1 that constructs the exterior of the motor and the attachment base 3, and within the area of the base portion 1b of the bracket opening 1a, which makes it possible to miniaturize and flatten the motor in the axial direction and to reduce the motor weight.

The rotor R is assembled by sticking magnets 8 to an outer circumferential surface of a cup-shaped rotor yoke 7 and integrally attaching a center portion of the rotor yoke 7 and one end of the motor shaft 4. The motor shaft 4 is supported on the hollow cylinder portion 2 formed inside the bracket opening 1a via the bearing portions 5, 6, and the rotor R is rotatably assembled on the bracket 1 with a rotor yoke opening 7a facing toward a base portion 1b inside the bracket opening 1a. In this way, since the rotor yoke opening 7a is disposed facing the base portion 1b inside the bracket opening 1a and substrate-mounted components can be disposed using the empty space inside the rotor yoke opening 7a, it is possible to miniaturize the motor.

A fan (rotor blades) 9 is assembled on the other end of the motor shaft 4 that extends out of the bracket 1. When the fan 9 rotates, air is drawn from the center in the axial direction and expelled toward the outer circumference.

In FIG. 2, the gap between the bracket 1 and the attachment base 3 is sealed by a seal member (for example, a rubber member) 10. The seal member 10 is screwed to the attachment base 3 by fixing screws 11. A stator core 12 is held by being sandwiched between a stepped surface 10a of the seal member 10 and a stepped surface 1d provided on a radial-direction inner wall surface 1c of the bracket 1, and the seal member 10, the stator core 12, and the bracket 1 are integrally assembled by being screwed together via fixing screws 13 (see FIG. 1).

In FIG. 3, teeth 14 are provided on the ring-shaped stator core 12 toward the inside in the radial direction, and the respective teeth 14 are insulated by being covered by an insulator 15. Motor coils 16 are wound around the respective teeth 14. In the present embodiment, a three-phase DC brushless motor with six poles and twelve slots is used. The respective phases are wired together via a wiring groove 15a provided in the outer circumferential side of the insulator 15.

In FIG. 1 and FIG. 2, the motor substrate (PWB) 17 on which the motor driving circuit is formed is provided in the gap Q in the axial direction between (i) the rotor R and the stator S and (ii) the base portion 1b inside the bracket opening 1a of the bracket 1. More specifically, the motor substrate 17 is assembled on the stator S by fitting protrusions 15b provided on an upper end of the insulator 15 into substrate fitting holes (not shown).

Discrete components that are comparatively high (for example, a choke coil and an electrolytic capacitor 18) are disposed on the surface of the motor substrate 17 that faces the rotor yoke 7 and are therefore located within the empty space inside the rotor yoke opening 7a, and discrete components that generate a lot of heat (for example, a switching element such as a FET 19) are disposed on the surface of the motor substrate 17 that faces the bracket 1.

In this way, since the discrete components that are comparatively high are disposed on the surface of the motor substrate 17 that faces the rotor yoke 7 and are located within the empty space inside the rotor yoke opening 7a, the height of such substrate-mounted components can be absorbed in the axial direction in the empty space inside the rotor yoke opening 7a, which makes it possible to flatten the motor (i.e., to make the motor slimmer). For example, for a motor with an output of 50 W, it is possible to reduce the distance in the axial direction between the bracket 1 and the attachment base 3 to around 35 mm (i.e., a reduction of around half) and to reduce the weight of the motor to around one half to one third.

Also, if discrete components that generate a lot of heat are disposed on the surface of the motor substrate 17 that faces the bracket 1, it is possible to increase the dissipation of heat via the bracket 1 that is made of metal.

By assembling the fan 9 on the shaft end of the motor shaft 4 that extends out of the bracket 1, it is possible for the fan 9 to draw air from the center in the axial direction and expel air toward the outer circumference. For this reason, it becomes easier for heat generated by heat generating components and the motor coils 16 to dissipate via the bracket 1, and therefore the dissipation of heat can be further improved.

Also, in FIG. 2, external connecting wires (i.e., a lead) 20 are connected to the motor substrate 17. The lead 20 passes through a gap between an inner circumferential surface of the bracket 1 and an outer circumferential surface of the stator core 12 and then passes through a through-hole 10b (see FIG. 3) provided in the seal member 10. The lead 20 finally passes through a center hole of a cylindrical grommet 21 provided in the attachment base 3 so as to exit the motor.

The gap between the bracket 1 and the attachment base 3 is sealed by the seal member 10, and since the stator core 12 is sandwiched between the stepped surface 10a of the seal member 10 and the stepped surface 1d of the radial-direction inner wall surface 1c of the bracket 1, it is possible to provide a motor whose driving circuit is not damaged by a salt spray test and is therefore sufficiently waterproof and vibration-proof to withstand use in extreme environments.

Although a vehicle fan motor has been described as an example in the present embodiment, the present invention is not limited to this and can also be applied to an air conditioner or the like. The present invention is also not limited to a fan motor and can be applied to a geared motor where a gear is provided at the output end of the motor shaft 4.

What is claimed is:

1. An inner rotor brushless motor where a rotor is disposed in a space surrounded by a ring-shaped stator,
   wherein the rotor and the stator are enclosed inside a sealed case assembled by covering an attachment base with a cup-shaped bracket,
   the rotor includes a cup-shaped rotor yoke and magnets that are provided on an outer circumferential surface of the rotor yoke, and is coupled to a motor shaft at a center of an opening of the rotor yoke,
   the motor shaft is supported on a bearing portion provided in a center of the bracket opening,
   the rotor is rotatably assembled on the bracket with the opening of the rotor yoke facing the base portion inside the bracket opening, and
   a motor substrate on which a motor driving circuit is formed is provided in a gap formed in an axial direction between (i) the rotor and the stator and (ii) a base portion inside a bracket opening of the bracket.

2. An inner rotor brushless motor according to claim 1,
   wherein discrete components that are comparatively high are disposed on a surface of a motor substrate that faces the rotor yoke and located in an empty space inside the rotor yoke, and
   discrete components that generate a lot of heat are disposed on a surface of the motor substrate that faces the bracket.

3. An inner rotor brushless motor according to claim 2,
   wherein the bracket and the attachment base are sealed by a seal member, and
   a stator core is sandwiched between a stepped surface of the seal member and a stepped surface on an inner wall surface of the bracket.

4. An inner rotor brushless motor according to claim 2,
   wherein the inner rotor brushless motor is a fan motor for use in a vehicle and has a fan attached to an end portion of a motor shaft that extends outside the bracket.

5. An inner rotor brushless motor according to claim 1,
   wherein the bracket and the attachment base are sealed by a seal member, and
   a stator core is sandwiched between a stepped surface of the seal member and a stepped surface on an inner wall surface of the bracket.

6. An inner rotor brushless motor according to claim 5,
   wherein the inner rotor brushless motor is a fan motor for use in a vehicle and has a fan attached to an end portion of a motor shaft that extends outside the bracket.

7. An inner rotor brushless motor according claim 1,
   wherein the inner rotor brushless motor is a fan motor for use in a vehicle and has a fan attached to an end portion of a motor shaft that extends outside the bracket.

* * * * *